3,538,186
POLYESTER COATING MATERIALS
Lionel J. Payette, Scotia, N.Y., assignor to General Electric Company, a corporation of New York
No Drawing. Filed Dec. 26, 1967, Ser. No. 693,086
Int. Cl. C08g 37/16
U.S. Cl. 260—839
8 Claims

ABSTRACT OF THE DISCLOSURE

The flexibility, resistance to heat shock and abrasion, and the thermal life properties of polyesters derived from lower dialkyl esters of iso- and terephthalic acid, a glycol and polyhydric alcohol having at least three hydroxyl groups are improved by the addition of phenol furfuraldehyde resin.

---

This invention relates to polyester base resinous coating compositions and to structures coated therewith. More particularly, it relates to such compositions which are characterized by salutary flexibility, heat shock resistance, thermal life and abrasion resistance.

Resinous coating compositions in the form of varnishes and enamels in which, for ease of application, the polymer base is dissolved in compatible solvents, are well known. Among such materials which have been widely used for insulating electrical structures such as wires are polyesters derived from dihydric alcohol or glycol, polyhydric alcohol containing at least three hydroxyl groups and lower alkyl isophthalate or terephthalate. Such polyesters are described in detail in patents such as 2,936,296; 3,249,578; 3,297,785; 3,312,645, among others, the teachings of such patents being incorporated herein insofar as they are pertinent to the present teaching.

While polyester base coating compositions such as those described above are very useful, with the continual emphasis placed in the magnet wire industry on flexibility, abrasion resistance and resistance to heat effects, there are constantly being sought such materials which have improved characteristics in these categories, which at the same time are easily and efficiently coated on structures such as wires, and it is a primary object of this invention to provide such materials.

Briefly, the present invention relates to polyesters derived as above which are much improved in the stated characteristics by the addition thereto of from about one to six weight percent of phenol furfuraldehyde resin based on the weight of the polyester resin.

Those features of the invention which are believed to be novel are set forth with particularity in the claims appended hereto. The invention will, however, be better understood and further objects and advantages thereof better understood from a consideration of the following description.

Briefly, the polyester resins useful in connection with the present invention comprise (a) from about 25 to 56 equivalent percent, preferably from 36 to 50 equivalent percent, of a lower dialkyl ester of isophthalic or terephthalic acid and mixtures thereof, (b) from about 15 to 46 equivalent percent, preferably from about 25 to 40 equivalent percent of ethylene glycol, and (c) from about 13 to 44 equivalent percent, preferably from 20 to 32 equivalent percent, of a saturated aliphatic polyhydric alcohol having at least three hydroxyl groups. Typical of the isophathalic and terephthalic acid esters which can be used are those dialkyl esters containing from one to eight, preferably from one to four, carbon atoms including dimethyl, diethyl, dipropyl, dibutyl, etc. esters. The terms "polyhydric alcohol" and "saturated aliphatic polyhydric alcohol having at least three hydroxyl groups" include both polyhydric alcohols in which the hydroxyl groups are connected by a plurality of carbon-to-carbon linkages, as well as other alcohols having three or more hydroxyl groups, such as glycerine, 1,1,1-trimethylolethane, sorbitol, mannitol, diglycerol, trimethylolpropane, dipentaerythritol, tris(2-hydroxyethyl)isocyanurate, etc. The ethylene glycol can be replaced in whole or in part by other diols including but not limited to butane-diol, neopentyl-diol, pentane-diol, and the like.

The term "equivalent percent" is used in its usual sense herein, it being the number of equivalents of the reactant divided by the total number of equivalents of all reactants times 100. The number of equivalents, then, is the number of moles of the reactant multiplied by the number of functional groups, such as carboxyl, ester, hydroxyl, isocyanate, etc. Thus, the equivalents of dimethylterephthalate is the number of moles of this material multiplied by two; for glycerine, the number of moles times three; and for ethylene glycol, the number of moles times two. Typical of the polyesters along with the others described in the above patent which can be used in the practice of this invention is one prepared from 46 equivalent percent (three moles) dimethylterephthalate, 31 equivalent percent (two moles) ethylene glycol, and 23 equivalent percent (one mole) 95 percent glycerine.

Typically, in preparing the polyester the materials are added along with xylene or other similar solvent to prevent sublimation of lower dialykyl esters of the acids to a three-necked flask having a thermometer, stirrer and a Vigreux column with a Dean & Stark trap and funnel on the column. A nitrogen blanket is also provided for the system. The system is heated for about 30 minutes, during which time the pot temperature rises to about 130° C. and the water and xylene azeotropically distill from the system. Then about 0.03 percent by weight of catalyst, such as lead acetate, which acts as an alcoholysis catalyst, is added, this material being based on the weight of the dimethylterephthalate, and heating is continued for about 3½ hours to a final temperature of about 240° C. For further details and methods of preparing the polyesters, reference should be made to the above patent.

The usual pigmenting materials are useful in connection with the present invention, it being kept in mind that where good electrical properties are required, they should be of an insulating character. Among the useful pigments included are iron oxides and the oxides of chromium, cobalt, cadmium, selenium, copper, titanium and manganese. The usual fillers employed in conjunction with resinous materials are also useful in the practice of this invention. In some cases the pigment serves a dual role as colorant and filler.

Polyester resins such as those described above can be cured or converted into the substantially infusible and insoluble state by heating at elevated temperatures of the order of about 200° C. to as high as 450° C. In order to accelerate the cure particularly at lower temperatures, various metal-containing curing catalysts can be employed including zinc octoate, cadmium octoate, organic titanate as well as various isocyanates.

The organic esters of titanium, which have been found useful in connection with the invention, correspond to the general formula

$$Ti(OR)_4$$

wherein R is a radical selected from the group consisting of the saturated and unsaturated aliphatic hydrocarbon radicals, for example, methyl, ethyl, etc. and vinyl, alkyl etc., aryl, aralkyl, alkaryl and cycloaliphatic radicals. Specific examples of esters of ortho titanic acids which may be employed include those substituted by methyl, ethyl, propyl, isopropyl, n-butyl, isobutyl, secondary butyl, tertiary butyl, etc. radicals, vinyl, allyl, butenyl radicals, etc., phenyl, naphthyl benzyl, cinnamyl and substituted phenyl or naphthyl, tolyl, xylyl and phenylethyl radicals, various cycloaliphatic esters such as tetracyclohexyl. These compounds may comprise, in addition, mixed esters having two or more different radicals of the group enumerated. It will be understood, of course, that mixtures of such titanates can be used and the term titanate, organic titanium ester material or organic titanium ester will be understood to include mixtures thereof. Generally, the titanium is used in amounts ranging from about 0.001 to about 10 percent based on the total solids in the wire enamel.

Any of the usual isocyanates can be used in conjunction with the present invention including, for example, those mentioned in U.S. Pat. 3,249,578, and particularly those blocked isocyanates known as Mondur-S and Mondur-SH, among others. Generally speaking, such isocyanates are added in amounts ranging from about one percent to five percent based on the weight of the total solids in the final wire enamel.

In order to improve the flexibility, smoothness of coating and the thermal life of such polyesters, metallic soaps such as the octoates, naphthenates and the like of metal such as cobalt, cerium, iron and manganese can be added, the amounts of such materials ranging generally from about 0.1 percent to 0.5 percent by weight based on the total weight of the solids in the wire enamel.

Among the solvents used in preparing coating compositions from the present polyesters are cresylic acids which are generally a mixture of ortho-, meta- and para-cresol. Hydrocarbon solvents can also be used including such materials as Solvesso 100 which is a mixture of mono-, di- and trialkyl (primarily methyl) benzenes having a flash point of about 113° F. and a distillation range of from about 318° F. to 352° F., such solvent being made by the Humble Oil Company. Another Humble solvent useful in the present connection is Humble 670 solvent, a mixture of mono-, di-, and trialkyl (primarily methyl) benzenes having a gravity API 60° F. of 31.6 percent, a specific gravity at 60° F. of 0.8676, a mixed aniline point of 11° F. and a distillation range of about 288° F. to 346° F.

The phenol furfuraldehyde resin useful in conjunction with the present invention can be prepared in any of a number of ways using furfuraldehyde and any phenol including phenol, substituted phenols, cresols, such as meta-, the ortho-cresol and mixtures thereof, xylenols and the like, such phenols being well known to those skilled in the art. Generally, such materials are made by reacting 0.8 to 1.5 mols of furfural for each mol of phenol along with a basic catalyst which can typically be triethanolamine and a solvent such as cresylic acid, the materials being reacted in the usual manner, for example, at 160–180° C. for about five to seven hours.

It is to be particularly emphasized that the advantages of the present invention are obtained only when the polyester cocerned is derived from the lower dialkyl esters of the polyhydric acids mentioned, that is, isophthalic acid and terephthalic acid. The use of the acids themselves in preparing the polyesters does not result in useful materials as taught by this invention. Neither, it is to be pointed out, are the advantages of the present invention obtained when the phenol furfuraldehyde resin is added, for example, to other ester-containing coating compositions such as those of the polyester-imide type.

The following examples illustrate the practice of the present invention, it being realized that they are to be taken as exemplary only and not limiting in any way except as specifically taught herein.

EXAMPLE 1

This example illustrates the preparation of the phenol furfuraldehyde or phenol furfural resin. There were reacted together in parts by weight 25.9 parts of a mixture of meta- and para-cresol, 25.3 parts of furfuraldehyde, 1.8 parts of triethanolamine and 46.9 parts of cresylic acid by heating the reactants at a temperature of 160° C. for six hours.

EXAMPLE 2

This example illustrates the preparation of a typical polyester which is useful in connection with the present invention. There were reacted together in the manner described above, by weight, 16.45 parts dimethyl terephthalate, 14.75 parts of tris(2-hydroxyethyl)isocyanurate, 2.69 parts of ethylene glycol and 0.05 part of tertiary butyl titanate, using as a solvent 31.6 parts of cresylic acid and 20.6 parts of the Humble 670 solvent mentioned above.

EXAMPLE 3

This example illustrates a typical prior art polyester resin wire enamel. A wire enamel was made using 704.4 parts of the polyester of Example 2, 13.7 parts Mondur-SH, 13.9 parts of phenol formaldehyde resin, 7.68 parts of tertiary butyl titanate and 3.6 parts of cobalt metal in the form of a cobalt soap solution, specifically cobalt naphthenate containing 6 percent by weight cobalt.

EXAMPLE 4

This example illustrates the preparation of another typical prior art polyester composition, there being mixed together 704.4 parts of the polyester of Example 2, 13.7 parts of Mondur-SH, 7.68 parts of tertiary butyl titanate and 3.6 parts of cobalt solution as above.

EXAMPLE 5

This example illustrates still another wire enamel composition, there being mixed together 704.4 parts of the polyester of Example 2, 13.9 parts of phenol furfuraldehyde resin, 7.68 parts of tertiary butyl titanate and 3.6 parts of cobalt solution as above.

EXAMPLE 6

In this example there were mixed together 1000 parts of the composition of Example 3, along with 16 parts of triazine resin, specifically American Cyanamid QR 336.

EXAMPLE 7

This example illustrates a typical preparation of the present invention, there being cold blended together 704.4 parts of the polyester of Example 2, 13.7 parts Mondur-SH, 34.6 parts of the composition of Example 1, 7.8 parts tertiary butyl titanate, and 3.6 parts of cobalt solution as above.

EXAMPLE 8

This example illustrates a typical preferred composition of the present invention. There were added together 704.4 parts of the polyester of Example 2, 13.7 parts of Mondur-SH, and 34.6 parts of the furfuraldehyde composition of Example 1. These materials were heated for from about one to four hours at temperatures ranging from about 160° C. to 180° C. The resulting material was cooled and then there were added thereto 7.68 parts tertiary butyl titanate and 3.6 parts of cobalt solution as above.

EXAMPLE 9

There was prepared a polyester as in Example 2 except that in lieu of the dimethyl terephthalate, there was used an equivalent amount of terephthalic acid. There were mixed together, by weight, 38.9 percent of the above polyester, 34 percent cresylic acid, 18 percent hydrocarbon, 1.7 percent Mondur-S, 2.4 percent tetrabutyl titanate, and 3.5 percent of the above phenol furfuraldehyde resin.

EXAMPLE 10

There was prepared a polyester imide by reacting dimethyl terephtalate, methylene dianiline, trimellitic anhydride and tris(2-hydroxyethyl)cyanurate as taught, for example, in British Pat. 973,377, there being added to the ester imide product tetrabutyl titanate, Mondur-SH and a phenol furfural resin along with cobalt naphthenate soap.

The compositions of Examples 3 through 8 and 10 above were made into wire enamels by adding thereto solvents such as cresol and hydrocarbon mixtures mentioned above, in well known manner, to bring the solids content of the wire enamel to 35 percent by weight. Specifically, 60 percent cresylic acid and 40 percent hydrocarbon are preferred.

Shown in the table below are the results of tests carried out on magnet wire 0.0403 inch in diameter, coated with the wire enamels so prepared, the wire being coated by six passes through the enamel and cured in a 5' tall wire tower having a bottom temperature of 200° C. and a top temperature of about 450° C.

The wires were visually inspected for smoothness in the usual manner and tested for flexural strength at 25 percent elongation, for heat shock after one hour at 175° C. and for thermal life and abrasion resistance. Such tests are well known in the art and are described, for example, in U.S. Pats. 3,297,785 and 2,936,296. Specifically, the flexibility of the coatings were determined by stretching the coated electrical conductor 25 percent of its original length and winding it about a stepped mandrel having diameters of one, two and three times the wire diameter, the smallest mandrel diameter at which failure does not occur being taken as the test point. Heat shock is measured by prestretching wire samples to elongation of 15 percent and winding the wire so stretched on a conical mandrel having a diameter ranging from 0.7 to ten times the diameter of the bare wire and having an apex angle of about 20° C., removing the conical shaped coil of wire from the mandrel and placing it in an air circulating oven at the indicated temperature for one hour and taking the arithmetical average of five coils measured at the largest diameter at which cracking appears, this diameter being expressed as the inside of the coil divided by the diameter of the wire. The thermal life of the coated magnet wire is the number of hours at 280° C. to failure of the coating as by cracking and the like.

TABLE I

|  | Example | | | | | | | |
| --- | --- | --- | --- | --- | --- | --- | --- | --- |
|  | 3 | 4 | 5 | 6 | 7 | 8 | 9 | 10 |
| Wire speed (ft./min.) | 12 | 10 | 12 | 10 | 10 | 12 | 12 | 12 |
| Build (mils) | 3.0 | 3.3 | 3.0 | 3.0 | 3.2 | 3.0 | 3.0 | 3.0 |
| Smoothness | B | B | B | B | B | B+ | B | B |
| Flex plus 25% elong. | (1) | (2) | (2) | (2) | (1) | (3) | (3) | (3) |
| Heat Shock (1hr./175°C.) | (2) | (2) | (2) | (1) | (4) | (4) | (5) | (5) |
| Thermal life (hrs./280° C.) | 117 | 63 | 43 | 137 | 164 | 225 | 40 | 120 |
| Emerson scrape (number) | 20 | 22 | 20 | 20 | 36 | 38 | 18 | 30 |

¹ 3× OK.   ² 3× fail.   ³ 1× OK.   ⁴ 2× OK.   ⁵ 10× OK.

From the above it will be seen that the compositions of the present invention, specifically those of Examples 7 and 8 and particularly the material of Example 8 in which the ingredients were heat blended together as described, are superior by far to those of the other described materials which are typical of the prior art. It will also be seen that, as pointed out above, from a comparison of Examples 7 and 8 with Examples 9 and 10 concerning an acidic derived polyester and a polyesterimide, respectively, the present invention is very specific in its limitation to polyesters derived from lower dialkyl esters of the acids concerned.

There are provided, then, by the present invention coating compositions which are particularly characterized by good flexibility, improved resistance to heat shock, good thermal life and resistance to abrasion. The present materials are useful as single composition coatings or they can, where desired, be used with overcoats of other materials including linear polymers such as polyethylene terephthalate and polyamide-imides.

What I claim as new and desire to secure by Letters Patent of the United States is:

1. A polyester based coating composition having a high solids content of about 35 weight percent, said polyester being essentially the reaction product of (a) from about 25 to 56 equivalent percent of a material selected from the group consisting of lower dialkyl esters of isophthalic acid and terephthalic acid and mixtures thereof, (b) from about 15 to 46 equivalent percent of ethylene glycol, and (c) from about 13 to 44 equivalent percent of a saturated polyhydric alcohol having at least three hydroxyl groups, and one to six percent, by weight of phenol furfuraldehyde resin based on the weight of the polyester base.

2. A composition as in claim 1 wherein (a) is 36 to 50 equivalent percent, (b) is 25 to 40 equivalent percent, and (c) is 20 to 32 equivalent percent.

3. A composition as in claim 1 wherein (a) is 46 equivalent percent, (b) is 31 equivalent percent, and (c) is 25 equivalent percent.

4. A composition as in claim 1 which contains additionally from about 0.001 to about 10 percent organic titanate based on the total solids.

5. A composition as in claim 1 wherein said composition contains from about 0.1 to about 0.5 percent metal curing catalyst based on the total weight of the solids.

6. A composition as in claim 1 which contains additionally from about 1 to 5 percent polyisocyanate based on the weight of the solids.

7. A composition as in claim 1 containing as an additional ingredient a triazine aldehyde resin.

8. A wire coated with the composition of claim 1.

References Cited

UNITED STATES PATENTS

| 2,566,851 | 9/1951 | Novotny et al. | 260—842 |
| 2,936,296 | 5/1960 | Prelopio et al. | 260—842 |
| 3,291,858 | 12/1966 | Oosterhuf et al. | 260—842 |
| 3,297,785 | 1/1967 | George et al. | 117—232 |
| 3,312,645 | 4/1967 | George et al. | 117—232 |

JOHN C. BLEUTGE, Primary Examiner

U.S. Cl. X.R.

117—128.4, 161, 221, 232; 260—19, 33.4, 33.6, 38, 842, 850